Sept. 20, 1971  R. R. DYSART  3,605,296
AMPHIBIOUS DITCH EXCAVATOR
Filed Sept. 20, 1968  2 Sheets-Sheet 1
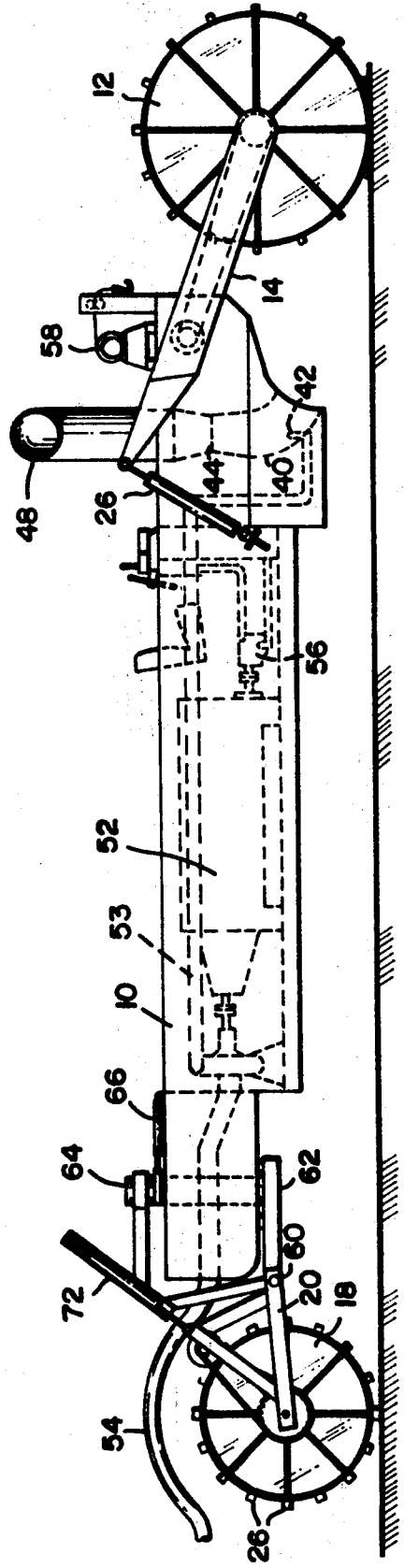
FIG_1
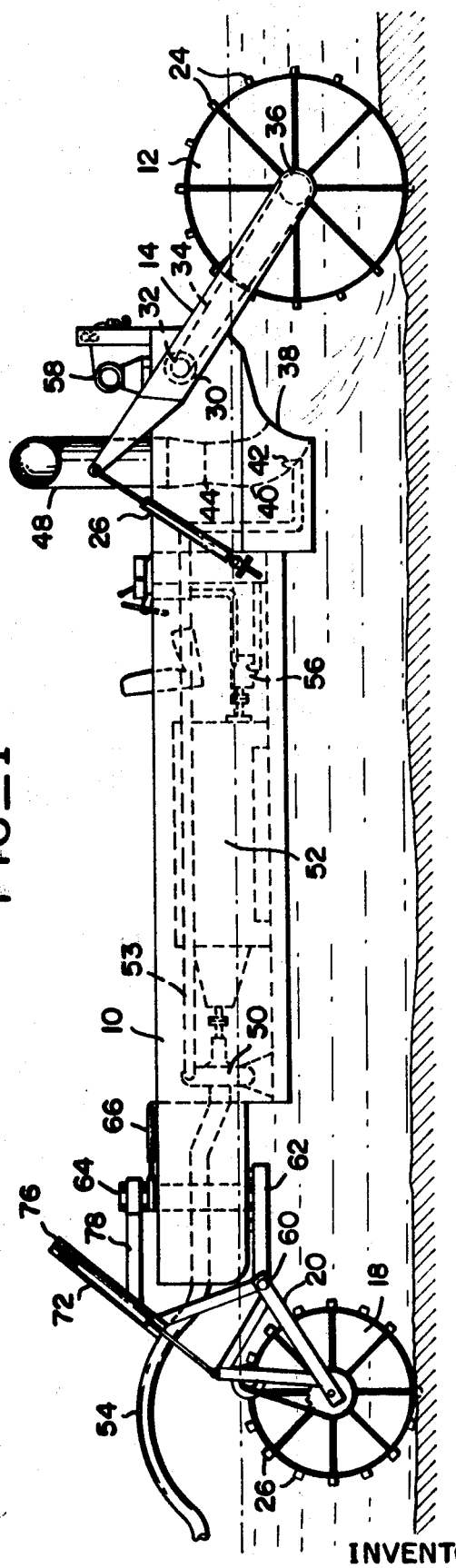
FIG_2
INVENTOR

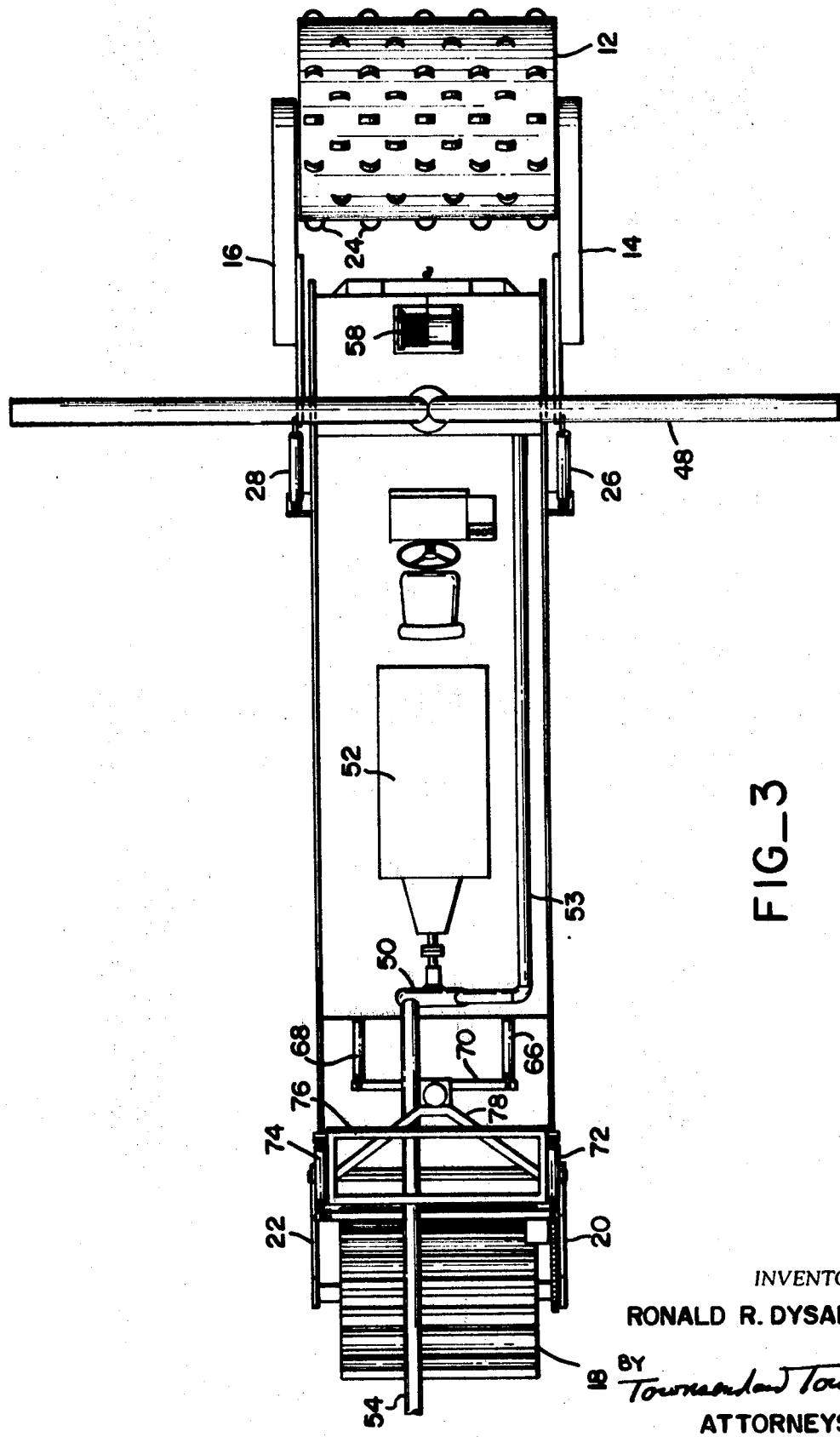
FIG_3

United States Patent Office 3,605,296
Patented Sept. 20, 1971

3,605,296
AMPHIBIOUS DITCH EXCAVATOR
Ronald R. Dysart, Oakland, Calif., assignor to Wetland
Engineering Co., Oakland, Calif.
Filed Sept. 20, 1968, Ser. No. 761,271
Int. Cl. E02f 3/88, 5/08
U.S. Cl. 37—61     2 Claims

ABSTRACT OF THE DISCLOSURE

An amphibious vehicle for cutting material from the bottom of a water-filled ditch by means of a revolving cylindrical drum which is studded with projecting cutting elements. The drum, which is journalled to the front of a watertight body member, can be lowered into contact with the bottom of a water-filled ditch when the body member is floating in the ditch. The slurry produced by the rotary cutting action of the drum is drawn into an opening in the bottom of the body member by suction and is pumped out a T-shaped conduit which extends transversely beyond both sides of the body member. The suction at the bottom of the conduit is produced by a jet-pump system in which a stream of water is pumped into the conduit through a jet nozzle near the opening in the bottom of the body member. This stream of water flows through a venturi constriction in the conduit, draws the slurry into the conduit opening, and propels it through the T-shaped conduit for discharge beyond the edges of the ditch. A second cylindrical drum is journalled to supporting arms which project from the rear of the body member. This drum is studded with projecting traction elements and can be lowered into contact with the bottom of the ditch and rotated to propel the body member along the ditch. The rear drum can also be turned from side to side for steering purposes, and the entire vehicle can be driven over land, marsh, or paved roads to reach its destination.

---

This invention relates to a mobile amphibious excavating machine for excavating or cleaning water-filled ditches.

Many mobile excavating machines have been devised in the past, both for dry land and submerged land, but none of these machine meet the requirements of excavating and cleaning small, water-filled ditches such as used for irrigating farmland or draining marshes. Dry land excavation equipment can be used to dig irrigation ditches in dry land, but it cannot be used to remove silt and vegetation from the bottom of the ditch after it has been filled with water. Dredging equipment can be used to excavate drainage ditches in marshlands, but it is cumbersome, expensive, difficult to transport across marshes, and hard to manage in confined spaces such as encountered in small ditches. Accordingly, the problem of excavating and cleaning water-filled ditches has been solved in the past by a combination of hand labor and makeshift equipment.

The object of this invention is to provide a simple self-propelled amphibious excavating machine which can be driven to any desired location over roads, open country, or marshland and which is capable of excavating and cleaning small water-filled ditches. The invention comprises a floatable body having a cutter mounted at one end and propulsing means mounted at the opposite end. The cutter is used to sever material from the bottom of a water-filled ditch, the material forming a kind of slurry with the water. The slurry is drawn into an orifice in the bottom of the body, the orifice being adjacent the cutter. There is means for drawing the slurry into the orifice, said means being preferably mounted on the body. Both the cutter and the propulsion means are adapted to carry the vehicle over land as well as through water.

In the embodiment described herein, the cutter couples a revolving cylindrical drum mounted on supporting arms which project from the front of the body. The propulsion means comprise a revolving cylindrical drum mounted on supporting arms which project from the rear of the body. The front drum is studded with projecting cutting teeth and can be lowered into contact with the bottom of a water-filled ditch when the body member is floating in the ditch. The drum is then rotated to cut material from the bottom of the ditch and to propel the slurry formed thereby toward the body member. The slurry is drawn into an orifice in the bottom of the body member and pumped out a T-shaped conduit which extends laterally beyond the sides of the body member. The suction at the orifice is produced by a jet-pump system, i.e., pumping a stream of water upward into the conduit from a jet nozzle near the opening. This stream of water flows through a venturi constriction in the conduit, draws the slurry into the opening, propels it through the conduit, and discharges it beyond the edges of the ditch. The rear drum can also be lowered to contact the bottom of the ditch and is studded with traction elements to propel the body member along the ditch when the rear drum is rotated. The rear drum can be turned from side to side for steering purposes. Protective covers can be placed over the cutting elements and traction elements of the drum so that the entire vehicle can be driven over roads, open fields or marshland to reach its destination.

Other objects and advantages of the invention will be apparent to those skilled in the art from the following description of one illustrative embodiment thereof, as illustrated in the attached drawings, in which:

FIG. 1 is a side view of one illustrative embodiment of the invention on dry land;

FIG. 2 is a side view of the same embodiment in a water-filled ditch; and

FIG. 3 is a top view of the embodiment shown in FIGS. 1 and 2.

Referring to FIG. 1, one embodiment of the invention comprises a watertight body member 10, a cylindrical drum 12 journalled between supporting arms 14 and 16 which project from the front of body member 10, and a cylindrical drum 18 journalled between supporting arms 20 and 22 which project from the rear of body member 10. Front drum 12 is studded with projecting cutting elements 24 (see FIG. 3) and rear drum 18 is studded with projecting traction elements 26. Supporting arms 14 and 16 for front drum 12 are journalled to body member 10 for upward and downward rotation about a common axis and are controlled by two hydraulic pistons 26 and 28 which are simultaneously actuated by a common hydraulic power source to raise and lower drum 12. In operation, as shown in FIG. 2, drum 12 is lowered into contact with the bottom of a water-filled ditch and rotated to cut earthy and/or vegetable material from the bottom of the ditch and to propel the slurry formed thereby toward body member 10. The rotary power for drum 12 is provided by a hydraulic motor 30 which is coupled to drum 12 via a drive shaft 32, a drive chain 34, and a drive sprocket 36 attached to drum 12. A similar chain drive is preferably employed on the opposite axial end of drum 12 to balance the driving torque.

The slurry formed by the rotary cutting action of drum 12 is drawn into an opening 38 which communicates into the bottom of conduit 40. The suction at opening 38 is formed by a stream of water which is pumped into conduit 40 through a jet nozzle 42 which projects into conduit 40 near opening 38. This stream of water passes through a venturi constriction 44 in conduit 40, draws the slurry into opening 38, propels it through conduit 40 and venturi constriction 44 to a T-shaped discharge conduit 48 which projects transversely beyond both sides of body member 10. The arms of conduit 48 are long enough to discharge the slurry beyond the lowermost lateral margins of the ditch so that it does not settle back into the place from which it was dredged. The arms of T-shaped conduit 48 are preferably removable near the sides of body member 10 so that they can be removed when the vehicle is being driven to and from its point of use.

Pumping power for the water stream pumped through jet nozzle 42 is generated by a rotary pump 50 which is driven by an internal combustion engine 52. The discharge part of pump 50 is coupled to jet nozzle 42 through conduit 53 and the intake part is coupled to intake conduit 54, whose other end is attached to a strainer (not shown in the drawings) for drawing clean water from the ditch into pump 50.

A hydraulic pump 56 is also driven by internal combustion engine 52. Hydraulic pump 56 provides the driving power for motor 30, which is hydraulically driven, and for the various hydraulic pistons, and for a hydraulically driven winch 58 at the front of body member 10. These hydraulic components are controlled in the customary manner by hydraulic controls mounted on an operators console.

The rear drum 18 is raised and lowered by rotating rear support arms 20 and 22 about their common axle 60 which extends transversely under body member 10 approximately parallel with the axis of drum 18. Axle 60 is attached by means of a framework 62 to a vertical post 64 that extends through body member 10 and is journalled for rotation about its own axis. Post 64 is turned either one way or another for steering purposes by a pair of hydraulic pistons 66 and 68, which act against a steering bar 70 attached to the top of post 64.

A pair of hydraulic pistons 72 and 74 are also attached to the top of post 64 by means of a rectangular supporting framework 76 and a triangular supporting framework 78. Pistons 72 and 74 are simultaneously actuated by the hydraulic controls to rotate support arms 20 and 22 around their common axle 60 to raise and lower rear drum 18. Pistons 72 and 74 are coupled to support arms 20 and 22 by means of a triangular shaped linkage. Rear drum 18 is rotated by a hydraulic motor driven chain drive such as used to rotate front drum 12. The rear drum, however, is rotated much more slowly than the front drum since it is used for traction rather than excavation.

When the vehicle is driven on land, protective strips are placed over the cutting elements 24 on front drum 12 and the traction elements 26 on rear drum 18. It will be noted that when the projecting elements on the drums are properly covered, the vehicle can be driven over paved roads, open country, or marshlands to reach its destination. This is an important feature of the invention. After the destination has been reached, the front and rear drums can be raised or lowered while the body member is floating in the ditch so as to reach the bottom of the ditch for cleaning or to excavate the bottom to the desired level.

Thus, it will be apparent that this invention provides an excavating machine which is particularly suited to excavating and cleaning water-filled ditches.

Although this invention has been disclosed by reference to one specific embodiment thereof, it is to be understood that this invention is not limited to the disclosed embodiment but rather includes all modifications falling within the scope of the following claims.

I claim:

1. A self-propelled vehicle for movement over water and land surfaces and for excavating water filled ditches, the vehicle comprising: a buoyant body including aperture means, a buoyant, substantially cylindrical cutting drum located adjacent a first end of the body in proximity of the aperture means, the drum including cutting elements distributed over its exterior surface, buoyant drive drum means located adjacent a second end of the body, mounting means rotatably mounting the cutting and the drive drums, maintaining the drum axes substantially parallel for straight line movement of the vehicle, positioning lowermost points of the drums beneath the body for movement of the vehicle over land while supported by the drums, means for rotating at least a portion of the mounting means around an upright axis for steering the vehicle along a curved path, pivot means connecting the mounting means and the body for lowering the drums with respect to the body to contact a lower portion of the drums with the ground beneath the water when the body floats in water, means for rotating the cutting drum to sever plant growth, soil and the like from the ditch bottom and discharge severed material towards the aperture means, means mounted to the body for sucking discharged materials through the aperture means into a conduit communicating with the aperture means and for discharging such materials laterally of the body past the ditch, and means for rotating the drive drums to thereby propel the vehicle while on land and on water.

2. A floating ditch excavator and cleaner comprising: an elongated water tight buoyant body member, a substantially cylindrical first drum journaled for rotation adjacent one end of the body member about an axis transverse to the longitudinal axis of the body member, a plurality of cutting elements projecting from the surface of the drum, first means for raising and lowering the drum with respect to the body member to contact the bottom of a water filled ditch when the body member is floating in such a ditch, first drive means for rotating the drum to cut material from the bottom of the water filled ditch and propel a slurry formed thereby towards the body member, at least one substantially cylindrical second drum journaled for rotation at the other end of the body member about an axis substantially parallel to the axis of the first drum, a plurality of traction elements projecting from the surface of the second drum, second means for raising and lowering the second drum with respect to the body member to contact the bottom of the water filled ditch when the body member is floating in such ditch, second rotary drive means for rotating the second drum to propel the excavator along the water filled ditch, the drums and the means for raising and lowering the drums with respect to the body member including means of sufficient strength to permit the support of the full weight of the excavator by the drums during movement of the excavator on land, the means for raising and lowering the drums further including means for maintaining the drums in an operative position in which support of the excavator on dry land raises the body member a relatively short distance above the land, the excavator further including a conduit extending through the body member and opening into the space beneath the body member and adjacent the first drum for receiving the slurry, a jet nozzle extending into the conduit near the opening and directed along the axis of the conduit away from the opening, means for pumping a stream of water out of the jet nozzle and into the conduit to draw the slurry into the opening and to propel it through the conduit, and means coupled to the conduit for conveying the stream of water and the slurry away from the body member and for discharging it beyond the lateral extent of the ditch being excavated by the first drum.

References Cited

UNITED STATES PATENTS

| | | | |
|---|---|---|---|
| 708,583 | 9/1902 | Powell | 37—70 |
| 349,381 | 9/1886 | Beard | 37—66 |
| 501,870 | 7/1893 | Collins | 37—66X |
| 703,817 | 7/1902 | Perry | 37—66X |
| 813,935 | 2/1906 | Avery, Jr. | 37—56 |
| 1,220,197 | 3/1917 | Cowles | 37—54X |
| 1,270,142 | 6/1918 | Gage, Sr. | 37—60X |
| 1,483,257 | 2/1924 | Von Balluseck | 37—94 |
| 1,538,565 | 5/1925 | Loken | 37—94 |
| 1,621,156 | 3/1927 | Dillahunt | 37—19X |
| 1,902,006 | 3/1933 | Woods | 115—1 |
| 2,044,088 | 6/1936 | Lord | 37—62UX |
| 2,812,737 | 11/1957 | Hoover | 115—1 |
| 2,853,812 | 9/1958 | Van Riet et al. | 115—1X |
| 3,180,442 | 4/1965 | Pomeroy | 115—1X |
| 3,306,250 | 2/1967 | Pitchford | 115—1 |
| 3,363,714 | 1/1968 | Orpana | 115—1X |

FOREIGN PATENTS

| | | | |
|---|---|---|---|
| 58,217 | 8/1891 | Germany | 114—42 |

ROBERT E. PULFREY, Primary Examiner

C. D. CROWDER, Assistant Examiner

U.S. Cl. X.R.

37—66, 70, 95; 115—1